J. C. WHEEDEN.
Method of Buoying Vessels.
No. 196,960. Patented Nov. 6, 1877.
— FIG. I. —
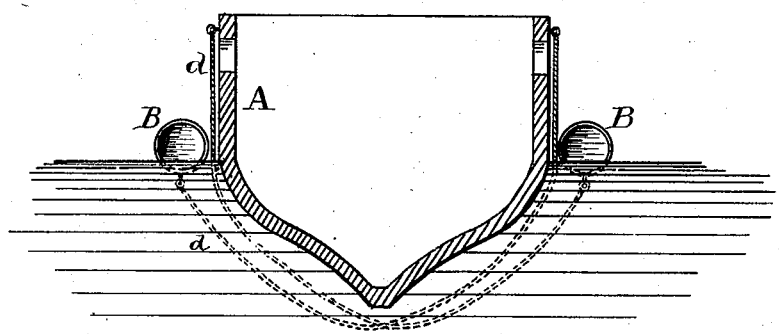
— FIG. II. —
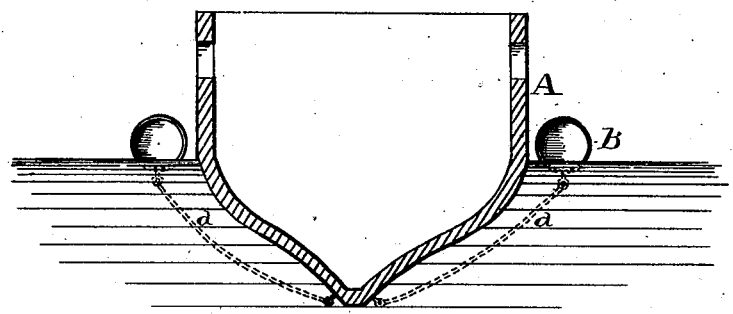
— FIG. III. —
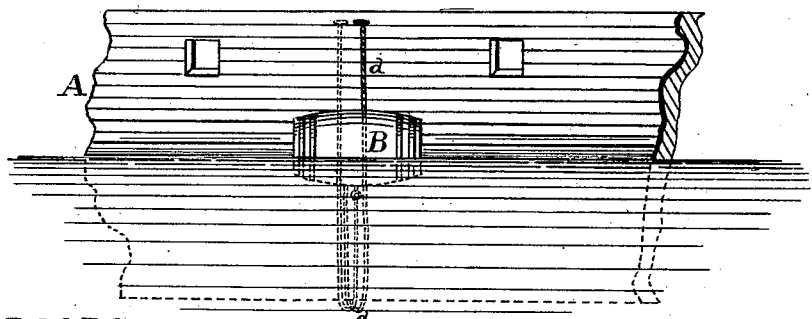
WITNESSES  
Chs. E. Lewis  
Jno. R. Spedden
INVENTOR  
James C. Wheeden  
By his Attorney  
Chas. B. Mann
N. PETERS, PHOTO-LITHOGRAPHER, WASHINGTON, D. C.

UNITED STATES PATENT OFFICE.

JAMES C. WHEEDEN, OF BALTIMORE, MARYLAND.

IMPROVEMENT IN METHODS OF BUOYING VESSELS.

Specification forming part of Letters Patent No. 196,960, dated November 6, 1877; application filed October 5, 1877.

*To all whom it may concern:*

Be it known that I, JAMES C. WHEEDEN, of Baltimore city, in the county of Baltimore and State of Maryland, have invented a new and useful Improvement in Methods of Preventing Vessels from Careening, which is fully set forth in the following specification and accompanying drawing, in which—

Figure 1 is a section view of the hull of a vessel with casks attached. Fig. 2 is a section of the hull of a vessel with casks attached in a modified manner. Fig. 3 is a side view of a vessel with casks attached.

My invention relates to an improved mode of preventing vessels that have discharged their cargo, and are without ballast, from careening or rolling over; and my invention consists in attaching a line to air-tight casks, floating on the water at the sides of the vessel, and passing the line from each cask under the keel and up the opposite side of vessel, where it is made fast.

A represents the hull of a vessel; B, the air-tight casks, which may be the ordinary water-casks with which all vessels are provided. The line $d$ is attached or made fast to the cask and passed under the keel, stretched hand-taut, and made fast to the opposite side of the vessel. If preferred, the line which is attached to the cask may be secured to the keel in any convenient manner, as shown in Fig. 2, instead of passing entirely under the vessel and up the opposite side.

By this arrangement the least inclination of a vessel to roll is checked. More than one cask on a side may be used, if found necessary.

Having described my invention, I claim and desire to secure by Letters Patent—

The method of preventing vessels from careening, by placing air-tight casks in the water along each side, to which a line is secured, and passed under the keel and up the opposite side, and made fast.

JAMES C. WHEEDEN.

Witnesses:
   JNO. R. SPEDDEN,
   CHAS. B. MANN.